(12) United States Patent
Barry et al.

(10) Patent No.: US 11,521,183 B2
(45) Date of Patent: Dec. 6, 2022

(54) METHODS, SYSTEMS, AND DEVICES FOR A SERVICE ORIENTED ARCHITECTURE FOR FACILITATING AIR FILTER REPLACEMENTS

(71) Applicant: Second Nature Brands, Inc., Raleigh, NC (US)

(72) Inventors: Kevin James Barry, Raleigh, NC (US); Thaddeus Worth Tarkington, Raleigh, NC (US)

(73) Assignee: SECOND NATURE BRANDS, INC., Raleigh, NC (US)

( * ) Notice: Subject to any disclaimer, the term of this patent is extended or adjusted under 35 U.S.C. 154(b) by 0 days.

(21) Appl. No.: 17/136,751

(22) Filed: Dec. 29, 2020

(65) Prior Publication Data

US 2021/0117932 A1  Apr. 22, 2021

Related U.S. Application Data

(63) Continuation of application No. PCT/US2019/040251, filed on Jul. 2, 2019.
(Continued)

(51) Int. Cl.
   *G06Q 30/06* (2012.01)
   *G06Q 10/08* (2012.01)
   (Continued)

(52) U.S. Cl.
   CPC ........... *G06Q 10/20* (2013.01); *G05B 19/042* (2013.01); *G06Q 10/087* (2013.01);
   (Continued)

(58) Field of Classification Search
   CPC .. G06Q 10/20; G06Q 10/0838; G06Q 10/087; G06Q 20/14; G06Q 20/34;
   (Continued)

(56) References Cited

U.S. PATENT DOCUMENTS 9,588,504 B2 * 3/2017 Hill .................... G05B 19/4184
10,049,513 B1 * 8/2018 Daman ................ H04B 10/116
(Continued)

OTHER PUBLICATIONS

PCT, International Search Report and Written Opinion in International application No. PCT/US2019/040251 dated Dec. 4, 2019.
(Continued)

*Primary Examiner* — Nicholas D Rosen
(74) *Attorney, Agent, or Firm* — NK Patent Law

(57) ABSTRACT

Disclosed herein are methods, systems, and devices for facilitating heating, ventilation, and air conditioning (HVAC) air filter replacement on at least one computing device. One method includes identifying interface requirements for a set of services to be implemented between service oriented architecture (SOA) front-end components and SOA back-end components. One of the SOA front-end components is configured to communicate with a home automation system of a first user and one of the SOA front-end components is configured to communicate with a graphical user interface (GUI) associated with the first user. One of the SOA back-end components is configured to communicate with a weather service database and one of the SOA back-end components is configured to communicate with an order fulfillment service. The SOA front-end components are operable to be combined with the SOA back-end components to form an operable SOA solution.

22 Claims, 6 Drawing Sheets

Related U.S. Application Data

(60) Provisional application No. 62/692,991, filed on Jul. 2, 2018.

(51) Int. Cl.
  *G06Q 20/14* (2012.01)
  *G06Q 20/34* (2012.01)
  *G06Q 10/00* (2012.01)
  *G05B 19/042* (2006.01)
  *G06Q 30/00* (2012.01)

(52) U.S. Cl.
  CPC ......... *G06Q 10/0838* (2013.01); *G06Q 20/14* (2013.01); *G06Q 20/34* (2013.01); *G06Q 30/016* (2013.01); *G06Q 30/0633* (2013.01); *G06Q 30/0639* (2013.01); *G05B 2219/2614* (2013.01); *G05B 2219/2642* (2013.01)

(58) Field of Classification Search
  CPC ............. G06Q 30/016; G06Q 30/0633; G06Q 30/0639; G05B 19/042; G05B 2219/2614; G05B 2219/2642
  USPC ...................................................... 705/26.8
  See application file for complete search history.

(56) References Cited

U.S. PATENT DOCUMENTS

| | | | |
|---|---|---|---|
| 10,230,740 B2 * | 3/2019 | Beatty | H04L 67/10 |
| 10,363,509 B2 * | 7/2019 | Arthur | B01D 46/10 |
| 10,610,818 B2 * | 4/2020 | Fox | F24F 11/00 |
| 11,029,807 B2 * | 6/2021 | Eicher | G06F 3/04842 |
| 2013/0067428 A1 | 3/2013 | Appleyard et al. | |
| 2015/0302510 A1 | 10/2015 | Godsey et al. | |
| 2016/0132948 A1 * | 5/2016 | Saveliev | G06Q 10/0875 705/26.4 |
| 2016/0187367 A1 | 6/2016 | Zhao et al. | |
| 2016/0315955 A1 * | 10/2016 | Beatty | H04L 63/1425 |
| 2016/0378076 A1 * | 12/2016 | Hill | G05B 19/4184 700/28 |
| 2017/0046766 A1 * | 2/2017 | Rolles | G06Q 30/0627 |
| 2017/0115851 A1 * | 4/2017 | Eicher | G06F 3/0482 |
| 2017/0361259 A1 * | 12/2017 | Fox | B01D 46/0086 |
| 2018/0012479 A1 | 1/2018 | Seaton et al. | |
| 2018/0089614 A1 * | 3/2018 | Laskowitz | G06Q 10/06316 |
| 2018/0140989 A1 * | 5/2018 | Arthur | B01D 46/0086 |
| 2018/0225896 A1 * | 8/2018 | Daman | G07C 5/008 |

OTHER PUBLICATIONS

PCT, International Preliminary Report on Patentability in International application No. PCT/US2019/040251 dated Jan. 5, 2021.

* cited by examiner

METHODS, SYSTEMS, AND DEVICES FOR A SERVICE ORIENTED ARCHITECTURE FOR FACILITATING AIR FILTER REPLACEMENTS

PRIORITY

This application is a continuation of PCT Patent Application No. PCT/US2019/040251 entitled "METHODS, SYSTEMS, AND DEVICES FOR A SERVICE ORIENTED ARCHITECTURE FOR FACILITATING AIR FILTER REPLACEMENTS," which was filed on Jul. 2, 2019, which claims benefit of and priority to U.S. Provisional Patent Application Ser. No. 62/692,991 entitled "METHODS, SYSTEMS, AND DEVICES FOR A SERVICE ORIENTED ARCHITECTURE FOR FACILITATING AIR FILTER REPLACEMENTS" filed Jul. 2, 2018, the contents of both of which are incorporated by reference herein.

TECHNICAL FIELD

The present invention relates to service oriented architectures including front-end and back-end components. More specifically; methods, systems, and devices are disclosed for facilitating air filter replacements via a service oriented architecture (SOA).

BACKGROUND

Air filter maintenance and replacement for heating, ventilation, and air conditioning (HVAC) systems is normally performed on a routine schedule based on filter type and general operating conditions. However these methods may replace filters too soon adding costs to the maintenance and unnecessary waste of filters or may replace the filters too late causing added load the HVAC systems and poorer air quality.

As such, new methods, systems, and devices are needed to better predict and optimize a maintenance schedule for HVAC air filters.

SUMMARY

Disclosed herein are methods, systems, and devices for solving the problem of optimizing a maintenance schedule for heating, ventilation, and air conditioning (HVAC) air filters; and triggering a replacement order. More specifically; devices, systems, and methods are disclosed for enabling a middleware solution for the integration of such services.

According to one embodiment, a method is implemented on at least one computing device for facilitating a heating, ventilation, and air conditioning (HVAC) air filter replacement for a first user (e.g. customer). The method includes identifying interface requirements for a set of services to be implemented between service oriented architecture (SOA) front-end components and SOA back-end components. The SOA includes a first SOA front-end component that is configured to communicate with a home automation system of the first user and a second SOA front-end component that is configured to communicate with a graphical user interface (GUI) associated with the first user (e.g. customer) and/or a customer service representative.

The SOA also includes a first SOA back-end component that is configured to communicate with a weather service database, and a second SOA back-end component that is configured to communicate with an order fulfillment service. The SOA front-end components are operable to be combined with the SOA back-end components to form an operable SOA solution. The method further includes triggering an air filter order for the first user via the order fulfillment service, based upon determining an existing air filter of the first user is due for replacement. The triggering of the air filter order may be further based upon an inventory level of an air filter type and/or an air filter size, and/or a prioritization level of the first user (e.g. premium level customer).

In some embodiments the method further may further include receiving previous order data (e.g. historical order data) associated with the first user from the order fulfillment service and the previous order data may include a date of a previous air filter shipment. The previous order data may include an air filter type and an air filter size of a last air filter shipment.

In some embodiments, the method may further include receiving first profile data from the GUI. The first profile data may include a first user identification and a first HVAC location. The first HVAC location may be a geolocation, such as a shipping address for the first user. The first profile data may include billing information, such as credit card information. The first profile data may also include an air filter size and an air filter type. The air filter type may be a fiberglass filter, a poly filter, an accordion filter, a foam filter, a foldable filter, a pleated filter, a high efficiency particulate arrestance (HEPA) filter, a washable filter, or the like. The first profile data may also include an HVAC system type, HVAC tonnage data; and/or a heated and/or cooled square footage associated the first HVAC location.

In some embodiments, the GUI may be provided by a smart phone, a tablet, a laptop, a smart TV, a smart watch, and/or a personal computer. The GUI may also be provided by a web browser, such as a Microsoft Internet Explorer® browser, a Microsoft Edge® browser, an Apple Safari® browser, a Google Chrome® browser, a Mozilla Firefox® browser, an Opera® browser, a Chromium® browser, a Vivaldi® browser, a Tor® browser, or the like. In other embodiments, the GUI may be further provided by a dedicated application developed specifically for HVAC air filter maintenance. In other embodiments, the GUI may be provided by an augmented reality device and the augmented reality device may be configured for determining an air filter size. For example, the method may include receiving an air filter size from the augmented reality device.

In some embodiments, the first profile data further may include network communication information for the home automation system of the first user, and the first SOA front-end component may be further configured to communicate with a virtual assistant of the first user, such as an Alexa® virtual assistant, a Siri® virtual assistant, a Cortana® virtual assistant, a Google® assistant, or the like. The first SOA front-end component may be configured to receive motion sensor data from the home automation system of the first user. The first SOA front-end component may also be configured to receive air quality data, door activity data, window activity data, internal/external temperature data, barometric pressure data, humidity data, thermostat data, electrical usage data, and/or HVAC run hour data from the home automation system of the first user.

In some embodiments, the second SOA front-end component may also be configured to receive user survey data from the GUI. The first user survey data may include a date of last filter replacement, a quantity of occupants of the HVAC location, life style data associated with the first user, and/or a preferred air filter type.

In some embodiments, the first SOA back-end component may be configured to receive current weather data and/or historical weather data for the first HVAC location. The operable SOA solution may also be configured to receive geographical data, utility usage data, and/or crowdsourced data associated with the first HVAC location via one or more back-end or front-end SOA components. The crowdsourced data may include HVAC maintenance data associated a second HVAC location and the second HVAC location may be within a similar weather zone of the first HVAC location. In other embodiments, the second HVAC location may be within a same postal zip code as the first HVAC location.

In some embodiments, the method may also include receiving thermostat monitoring data from a thermostat monitoring device and the thermostat monitoring device may be configured to be installed behind a thermostat of the first user.

In some embodiments, the GUI may be provided by a mobile device that includes a barometric pressure sensor. The GUI may be configured for instructing the first user to position the mobile device in front of the existing air filter and the method may further comprises receiving barometric pressure data captured at the mobile device. The GUI may also be configured to provide survey data associated with the existing air filter of the first user. The survey data may include a number of occupants, allergy data associated with the occupants, a number of pets, a type of pet, and/or the like.

In another embodiment, a server is disclosed. The server includes a memory and at least one processor for implementing a method for facilitating an HVAC air filter replacement for a first user. The method includes identifying interface requirements for a set of services to be implemented between SOA front-end components and SOA back-end components. The SOA includes a first SOA front-end component that is configured to communicate with a home automation system of the first user and a second SOA front-end component that is configured to communicate with a GUI associated with the first user and/or a customer service representative.

The SOA also includes a first SOA back-end component that is configured to communicate with a weather service database, and a second SOA back-end component that is configured to communicate with an order fulfillment service. The SOA front-end components are operable to be combined with the SOA back-end components to form an operable SOA solution. The method further includes triggering an air filter order for the first user via the order fulfillment service, based upon determining an existing air filter of the first user is due for replacement. The triggering of the air filter order may be further based upon an inventory level of an air filter type and/or an air filter size, and/or a prioritization level of the first user.

In another embodiment, a non-transitory computer-readable storage. The non-transitory computer-readable storage medium stores instructions to be implemented on at least one computing device including at least one processor. The instructions when executed by the at least one processor cause the at least one computing device to perform a method for facilitating an HVAC air filter replacement for a first user. The method includes identifying interface requirements for a set of services to be implemented between SOA front-end components and SOA back-end components. The SOA includes a first SOA front-end component that is configured to communicate with a home automation system of the first user and a second SOA front-end component that is configured to communicate with a GUI associated with the first user and/or a customer service representative.

The SOA also includes a first SOA back-end component that is configured to communicate with a weather service database, and a second SOA back-end component is configured to communicate with an order fulfillment service. The SOA front-end components are operable to be combined with the SOA back-end components to form an operable SOA solution. The method further includes triggering an air filter order for the first user via the order fulfillment service, based upon determining an existing air filter of the first user is due for replacement. The triggering of the air filter order may be further based upon an inventory level of an air filter type and/or an air filter size, and/or a prioritization level of the first user.

In another embodiment, a method is implemented on at least one computing device for facilitating an HVAC air filter replacement for a first user. The method includes identifying interface requirements for a set of services to be implemented between SOA front-end components and SOA back-end components. The SOA includes a first SOA back-end component that is configured to communicate with a weather service database, a second SOA back-end component that is configured to communicate with an order fulfillment service, and a third SOA back-end component that is configured to communicate with a home automation provider. The SOA front-end components are operable to be combined with the SOA back-end components to form an operable SOA solution. The first profile data includes a first user identification, a first HVAC location, an air filter size, and an air filter type. The method also includes triggering an air filter order for the first user via the order fulfillment service, based upon determining an existing air filter of the first user is due for replacement.

In another embodiment, a server is disclosed. The server includes a memory and at least one processor for implementing a method for facilitating an HVAC air filter replacement for a first user. The method includes identifying interface requirements for a set of services to be implemented between SOA front-end components and SOA back-end components. The SOA includes a first SOA back-end component that is configured to communicate with a weather service database, a second SOA back-end component that is configured to communicate with an order fulfillment service, and a third SOA back-end component that is configured to communicate with a home automation provider. The SOA front-end components are operable to be combined with the SOA back-end components to form an operable SOA solution. The first profile data includes a first user identification, a first HVAC location, an air filter size, and an air filter type. The method also includes triggering an air filter order for the first user via the order fulfillment service, based upon determining an existing air filter of the first user is due for replacement.

In another embodiment, a non-transitory computer-readable storage medium stores instructions to be implemented on at least one computing device including at least one processor. The instructions when executed by the at least one processor cause the at least one computing device to perform a method for facilitating an HVAC air filter replacement for a first user. The method includes identifying interface requirements for a set of services to be implemented between SOA front-end components and SOA back-end components. The SOA also includes a first SOA back-end component that is configured to communicate with a weather service database, a second SOA back-end component is configured to communicate with an order fulfillment service, and a third SOA back-end component is configured to communicate with a home automation provider. The SOA front-end components are operable to be combined with the SOA back-end components to form an operable SOA solution. The first profile data includes a first user identification, a first HVAC location, an air filter size, and an air filter type. The method also includes triggering an air filter order for the first user via the order fulfillment service, based upon determining an existing air filter of the first user is due for replacement.

In another embodiment, a method is implemented on at least one computing device for facilitating an HVAC air filter replacement for a first user. The method includes establishing a transmission control protocol (TCP) connection with a client device of a first user and receiving, from the client device, a TCP packet including a source internet protocol (IP) address and an hypertext transfer protocol (HTTP) request message. The method also includes (1) determining a geolocation based on the source IP address; (2) determining climate data associated with the geolocation; (3) determining a first replacement schedule of a first air filter type based on the climate data; and (4) transmitting, to the client device, the first air filter type and the first replacement schedule.

In some embodiments, the method may also include receiving, from the client device, an air filter size; determining a first air filter price of the first air filter type; and transmitting, to the client device, the first air filter price. The method may further include determining a second replacement schedule of a second air filter type based on the climate data; determining a second air filter price of the second air filter type; and transmitting, to the client device, the second air filter type and the second air filter price.

In another embodiment, a server is disclosed. The server includes a memory and at least one processor for implementing a method for facilitating an HVAC air filter replacement for a first user. The method includes establishing a TCP connection with a client device of a first user and receiving, from the client device, a TCP packet including a source IP address and an HTTP request message. The method also includes (1) determining a geolocation based on the source IP address; (2) determining climate data associated with the geolocation; (3) determining a first replacement schedule of a first air filter type based on the climate data; and (4) transmitting, to the client device, the first air filter type and the first replacement schedule.

In another embodiment, a non-transitory computer-readable storage. The non-transitory computer-readable storage medium stores instructions to be implemented on at least one computing device including at least one processor. The instructions when executed by the at least one processor cause the at least one computing device to perform a method for facilitating an HVAC air filter replacement for a first user. The method includes establishing a TCP connection with a client device of a first user and receiving, from the client device, a TCP packet including a source IP address and an HTTP request message. The method also includes (1) determining a geolocation based on the source IP address; (2) determining climate data associated with the geolocation; (3) determining a first replacement schedule of a first air filter type based on the climate data; and (4) transmitting, to the client device, the first air filter type and the first replacement schedule.

The features and advantages described in this summary and the following detailed description are not all-inclusive. Many additional features and advantages will be apparent to one of ordinary skill in the art in view of the drawings, specification, and claims presented herein.

BRIEF DESCRIPTION OF THE DRAWINGS

The present embodiments are illustrated by way of example and are not intended to be limited by the figures of the accompanying drawings. In the drawings.

DETAILED DESCRIPTION

Figure 1:
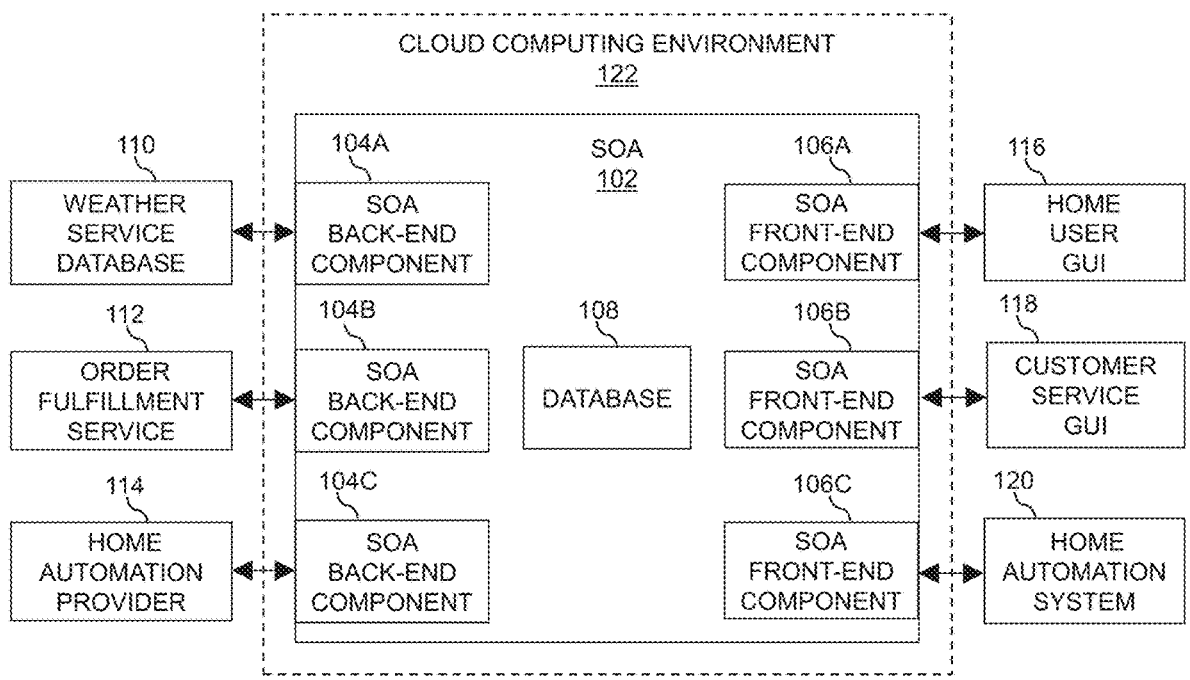
FIG. 1 depicts a block diagram illustrating a system diagram for a service oriented architecture (SOA) providing an interface to back-end components and front-end components in accordance with embodiments of the present disclosure.

The following description and drawings are illustrative and are not to be construed as limiting. Numerous specific details are described to provide a thorough understanding of the disclosure. However, in certain instances, well-known or conventional details are not described in order to avoid obscuring the description. References to "one embodiment" or "an embodiment" in the present disclosure can be, but not necessarily are, references to the same embodiment and such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

The subject matter disclosed herein relates to middleware (e.g. a service oriented architecture) including front-end and back-end components. More specifically methods, systems, and devices are disclosed for solving the problem of optimizing a maintenance schedule for heating, ventilation, and air conditioning (HVAC) air filters; and triggering a replacement order.

A block diagram 100 is shown in FIG. 1 illustrating a service oriented architecture (SOA) 102 in accordance with embodiments of the present disclosure. The SOA 102 provides a logical representation of a repeatable business activity (e.g. triggering replacement orders for a plurality of users for HVAC filters) and can mirror these real-world business activities. Additionally the SOA 102 provides other services (e.g. optimizing maintenance schedules for HVAC filters). The SOA 102 basically provides a "black box" functionality for customer facing entities such as graphical user interfaces (GUIs) and home automation systems. The SOA 102 includes SOA back-end components 104A-C, SOA front-end components 106A-C, and a database 108. The SOA back-end components 104A-C and SOA front-end components 106A-C may provide one or more application programming interfaces (APIs), extensible markup language (XML) interfaces, and/or an electronic data interchange (EDI) interfaces towards the customer facing entities and backend services (e.g. weather services, order fulfillment services, etc.). The database 108 may be configured to provide indexed, searchable, non-volatile storage for the SOA back-end components 104A-C and the SOA front-end components 106A-C. In some embodiments, the database 108 may be an open source database such as the PostgreSQL® database.

The SOA back-end component 104A is configured to communicate with at least one weather service database 110. For example, the weather service database 110 may be the National Oceanic and Atmospheric Administration (NOAA) database. The SOA back-end component 104B is configured to communicate with at least one of an order fulfillment service 112. In some embodiments, the order fulfillment service 112 may be an air filter specific order fulfillment service. In other embodiments, the order fulfillment service 112 may be a more generic order fulfillment service such as Amazon®. The SOA back-end component 104C is configured to communicate with at least one home automation provider 114. For example, the home automation provider may be the Nest® home automation provider or the like. The SOA back-end components 104A-C may be coupled to the weather service database 110, order fulfillment service 112, and the home automation provider 114 by a combination of the Internet, wide area network (WAN) interfaces, local area network (LAN) interfaces, wired interfaces, wireless interfaces, and/or optical interfaces.

The SOA front-end component 106A is configured to communicate with at least one of home user graphical user interface (GUI) 116. The home user GUI 116 may be provided by a smart phone, a tablet, a laptop, a smart TV, a smart watch, and/or a personal computer. The home user GUI 116 may also be provided by a web browser, such as a Microsoft Internet Explorer® browser, a Microsoft Edge® browser, an Apple Safari® browser, a Google Chrome® browser, a Mozilla Firefox® browser, an Opera® browser, a Chromium® browser, a Vivaldi® browser, a Tor®, or the like. In other embodiments, the home user GUI 116 may be further provided by a dedicated application developed specifically for HVAC air filter maintenance.

In other embodiments, the GUI may be provided by an augmented reality (AR) device and the AR device may be configured for determining an air filter size. For example, the method may include receiving an air filter size from the AR device. In some embodiments, the AR device may be an AR headset. The AR headset may be at least one of a Vuzix Blade AR headset, a Meta Vision Meta 2 AR headset, a Optinvent Ora-2 AR headset, a Garmin Varia Vision AR headset, a Solos AR headset, an Everysight Raptor AR headset, a Magic Leap One headset, an ODG R-7 Smartglasses System, an iOS ARKit compatible device, an ARCore compatible device, or the like.

The SOA front-end component 106B is configured to communicate with at least one customer service GUI 118. The customer service GUI 118 may be provided by a personal computer, a workstation, or the like. The customer service GUI 118 may also be provided by a web browser such as a Microsoft Internet Explorer® browser, a Microsoft Edge® browser, an Apple Safari® browser, a Google Chrome® browser, a Mozilla Firefox® browser, an Opera® browser, a Chromium® browser, a Vivaldi® browser, a Tor® browser, or the like.

The home user GUI 116 and/or the customer service GUI 118 provide first profile data. The first profile data may include a first user identification and a first HVAC location. The first HVAC location may be a geolocation, such as a shipping address for the first user. The first profile data may include billing information, such as credit card information. The first profile data may also include an air filter size and an air filter type. The air filter type may be a fiberglass filter, a poly filter, an accordion filter, a foam filter, a foldable filter, a pleated filter, a high efficiency particulate arrestance (HEPA) filter, a washable filter, or the like. The first profile data may also include an HVAC system type, HVAC tonnage data; and/or a heated and/or cooled square footage associated the first HVAC location.

The SOA front-end component 106C is configured to communicate with at least one home automation system 120. The SOA front-end component 106C may be further configured to communicate with a home automation access point (i.e. hub) of the home automation system 120. For example, the home automation access point may be an Amazon® Ring®, an Apple Home Kit®. a Wink® hub, a Samsung SmartThings® hub, Harmony® hub, or the like. As the Internet-of-Things (IoT) continues to grow supporting more and more types of devices. The smart home industry has capitalized on this trend by providing an array of wirelessly enabled products. These devices include fans, appliances, thermostats, door locks, light switches, air quality detectors, light bulbs, smart electrical outlets, garage door openers, motion sensors, security cameras, and security sensors to name a few. These devices can provide valuable information associated with how clean or dirty an HVAC air filter may be.

The SOA 102 may be hosted in a cloud computing environment 122. The SOA 102 may be implemented on one or more servers. The SOA 102 may also include a non-transitory computer readable medium that includes a plurality of machine-readable instructions which when executed by one or more processors of the one or more servers are adapted to cause the one or more servers to perform a method of providing for HVAC air filter replacement for a plurality of home users.

In some embodiments, the SOA 102 may be implemented on a virtual (i.e. software implemented) server in the cloud computing environment 122. The virtual server may be implemented as a separate operating system (OS) running on one or more physical (i.e. hardware implemented) servers. Any applicable virtual server may by be used. The virtual server may be implemented within the Microsoft Azure® cloud computing data center environment. In other embodiments, the SOA 102 may be implemented on one or more servers in a networked computing environment located with a business facility and/or another data center. In some embodiments, the SOA 102 may be implemented within a virtual container, for example the Docker® virtual container.

In some embodiments, at least one of the SOA front-end components may be configured to communicate over the Internet and at least one of the SOA back-end components may be configured to communicate over the Internet. At least one of the SOA front-end components may be configured to communicate over at least one of an hypertext transfer protocol (HTTP) session, an HTTP secure (HTTPS) session, a secure sockets layer (SSL) protocol session, a transport layer security (TLS) protocol session, a datagram transport layer security (DTLS) protocol session, a file transfer protocol (FTP) session, a user datagram protocol (UDP), a transmission control protocol (TCP), and a remote direct memory access (RDMA) transfer. At least one of the SOA back-end components may be configured to communicate over at least one of an HTTP session, an HTTPS session, an SSL protocol session, a TLS protocol session, a DTLS protocol session, an FTP session, a UDP, a TCP, and an RDMA transfer.

The SOA 102 transforms the virtual server or the one or more servers into a machine that solves the problem of predicting and optimizing a maintenance schedule for HVAC air filters. Specifically, the SOA front-end components are operable to be combined with the SOA back-end components to form an operable SOA solution.

Figure 2:
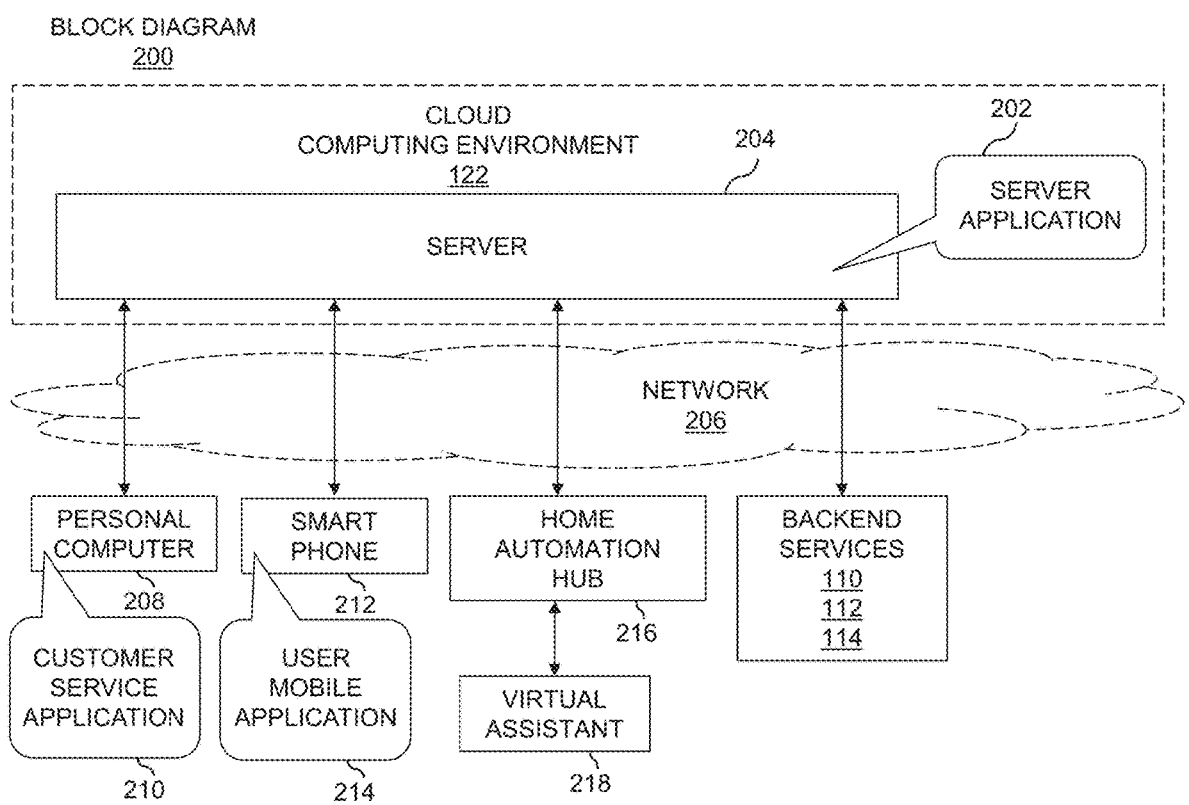
FIG. 2 depicts a block diagram illustrating a system diagram including user devices and backend services in accordance with embodiments of the present disclosure.

FIG. 2 depicts a block diagram 200 illustrating a system including a server application 202 hosted on a server 204 in accordance with embodiments of the present disclosure. The server application 202 includes the SOA 102 of FIG. 1. The server 204 is configured to communicate over a network 206 with a personal computer 208 that hosts a customer service application 210. The customer service application 210 is configured for receiving the first user profile from a customer service representative that is speaking with the user. In some embodiments the customer service application 210 may be a web application provided by a web browser.

The server 204 is also configured to communicate over the network 206 with a smart phone 212 that hosts user mobile application 214. The user mobile application 214 is configured for receiving the first user profile directly from the user. In some embodiments the user mobile application 214 may also be a web application provided by a web browser.

The server 204 is also configured to communicate with a home automation hub 216. The home automation hub 216 provides an aggregation method to link various smart home devices. Such smart home devices (not shown in FIG. 2) may include air quality sensors, door activity sensors, window activity sensors, internal/external temperature sensors, barometric pressure sensors, humidity sensors, thermostats, electrical usage sensors, and/or HVAC monitoring sensors, or the like. The home automation hub 216 may be an Amazon®, Ring®, Nest®, Apple Home Kit®, a Wink® hub, a Samsung SmartThings® hub, Harmony® hub, or the like. The home automation hub 216 is configured to communicate with a virtual assistant 218. The virtual assistant 218 may be an Alexa® virtual assistant, a Siri® virtual assistant, a Cortana® virtual assistant, a Google® assistant, or the like. In some embodiments, the home automation hub 216 and the virtual assistant 218 may be the same device.

The server 204 is also configured to communicate with the backend services of FIG. 1 including the weather service database 110, the order fulfillment service 112, and the home automation provider 115.

In certain embodiments, the network 206 is the Internet.

Figure 3:
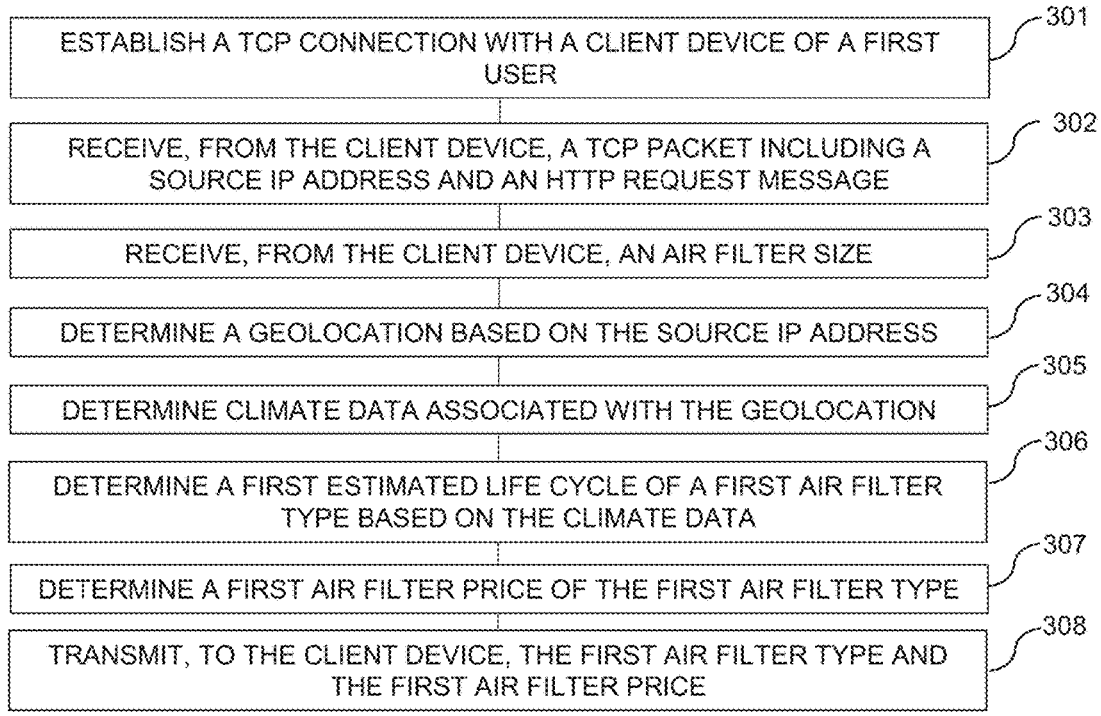
FIG. 3 illustrates a flowchart in accordance with embodiments of the present disclosure.

FIG. 3 depicts a flowchart 300 illustrating a method in accordance with another embodiment of the present disclosure. The method is implemented on at least one computing device for facilitating an HVAC air filter replacement for a first user. In step 301, the computing device establishes a TCP connection with a client device of the first user. In step 302, the computing device receives from the client device a TCP packet including a source IP address and an HTTP request message. In step 303, the computing device receives an air filter size from the client device. In some embodiments, step 303 may be omitted. In step 304, the computing device determines a geolocation of the client device based on the source IP address. In step 305, the computing device determines climate data associated with the geolocation. In some embodiments, the computing device receives the climate data from the weather service database 110 of FIG. 1. In step 306, the computing device determines a first replacement schedule of a first air filter type based on the climate data and other factors. The first air filter type may be a fiberglass filter, a poly filter, an accordion filter, a foam filter, a foldable filter, a pleated filter, a high efficiency particulate arrestance (HEPA) filter, a washable filter, or the like. In step 307, the computing device determines a first air filter price of the first air filter type. In some embodiments, the computing device may receive the first air filter price from the order fulfillment service 112 of FIG. 1. In step 308, the computing device transmits to the client device the first air filter type and the first air filter price.

In some embodiments (not shown in FIG. 3), the method may also include determining a second replacement schedule of a second air filter type based on the climate data; determining a second air filter price of the second air filter type; and transmitting, to the client device, the second air filter type and the second air filter price. The second air filter type may also be a fiberglass filter, a poly filter, an accordion filter, a foam filter, a foldable filter, a pleated filter, a high efficiency particulate arrestance (HEPA) filter, a washable filter, or the like.

Figure 4:
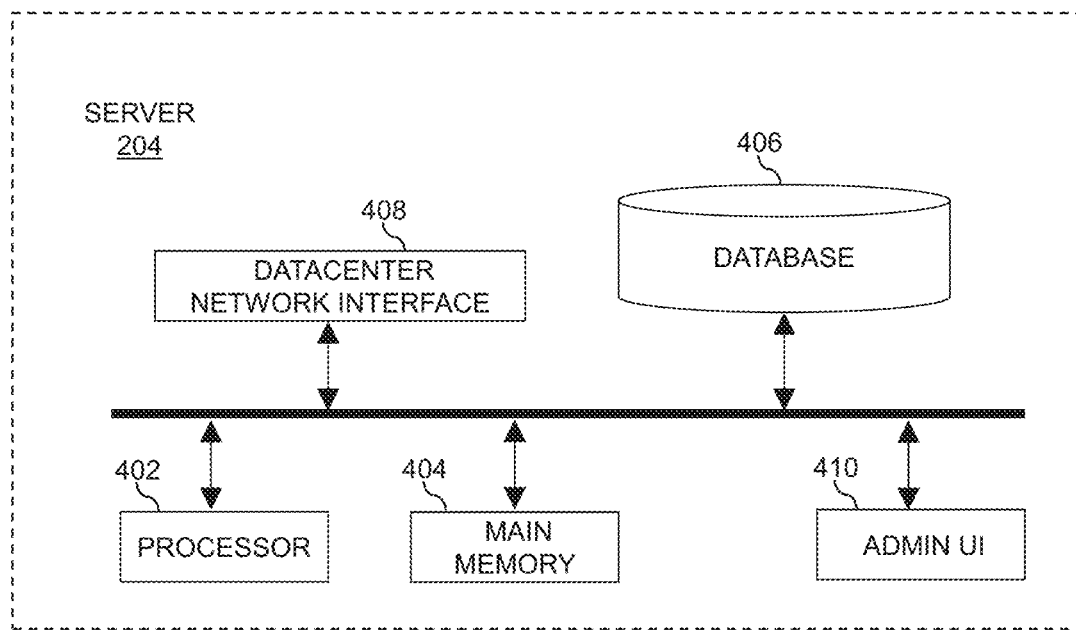
FIG. 4 depicts a block diagram illustrating a server in accordance with embodiments of the present disclosure.

FIG. 4 depicts a block diagram 400 illustrating components of the server 204 of FIG. 2 in accordance with embodiments of the present disclosure. The server 204 is configured to host a least a portion of the SOA 102. The server 204 may include at least one of a processor 402, a main memory 404, a database 406, a datacenter network interface 408, and an administration user interface (UI) 410. The server 204 may be configured to host the virtual server discussed earlier in this disclosure. In some embodiments the virtual server may be distributed over a plurality of hardware servers using hypervisor technology.

The processor 402 may be a multi-core server class processor suitable for hardware virtualization. The processor may support at least a 64-bit architecture and a single instruction multiple data (SIMD) instruction set. The main memory 404 may include a combination of volatile memory (e.g. random access memory) and non-volatile memory (e.g. flash memory). The database 406 may include one or more hard drives. The database 406 may provide at least a portion of the functionality of the database 108 of FIG. 1.

The datacenter network interface 408 may provide one or more high-speed communication ports to data center switches, routers, and/or network storage appliances. The datacenter network interface 408 may include high-speed optical Ethernet, InfiniB and (IB), Internet Small Computer System Interface iSCSI, and/or Fibre Channel interfaces. The administration UI may support local and/or remote configuration of the server 204 by a data center administrator. The server 204 is transformed to provide a machine (e.g. SOA102) that solves the problem of predicting and optimizing a maintenance schedule for HVAC air filters.

Figure 5:
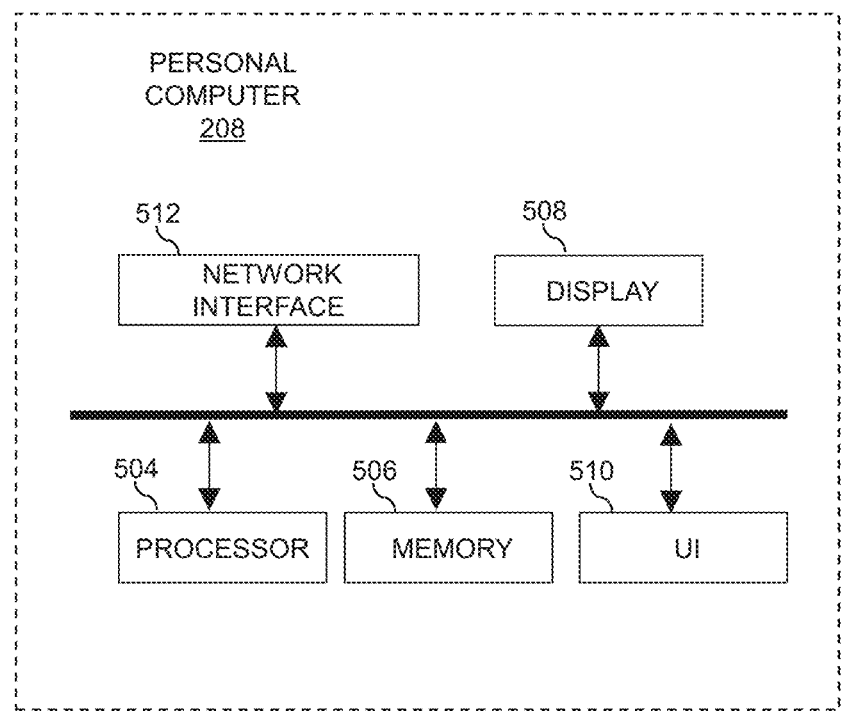
FIG. 5 depicts a block diagram illustrating a personal computer in accordance with embodiments of the present disclosure.

FIG. 5 depicts a block diagram 500 illustrating the personal computer 208 of FIG. 2 in accordance with embodiments of the present disclosure. The personal computer 208 may provide the home user GUI 116 and/or the customer service GUI 118 of FIG. 1. The personal computer 208 may include at least a processor 504, a memory 506, a display 508, a user interface (UI) 510, and a network interface 512. The personal computer 208 may include an operating system to run the web browser of FIG. 1. The operating system may be a Windows® OS, a Macintosh® OS, a Linux® OS, or the like. The memory 506 may include a combination of volatile memory (e.g. random access memory) and non-volatile memory (e.g. solid state drive and/or hard drives). The display 508 may be an external display (e.g. computer monitor) or internal display (e.g. laptop). The UI 510 may include a keyboard, and a pointing device (e.g. mouse). The network interface 512 may be a wired Ethernet interface or a Wi-Fi interface. The personal computer 208 may be configured to access remote memory (e.g. network storage and/or cloud storage) via the network interface 512.

Figure 6:
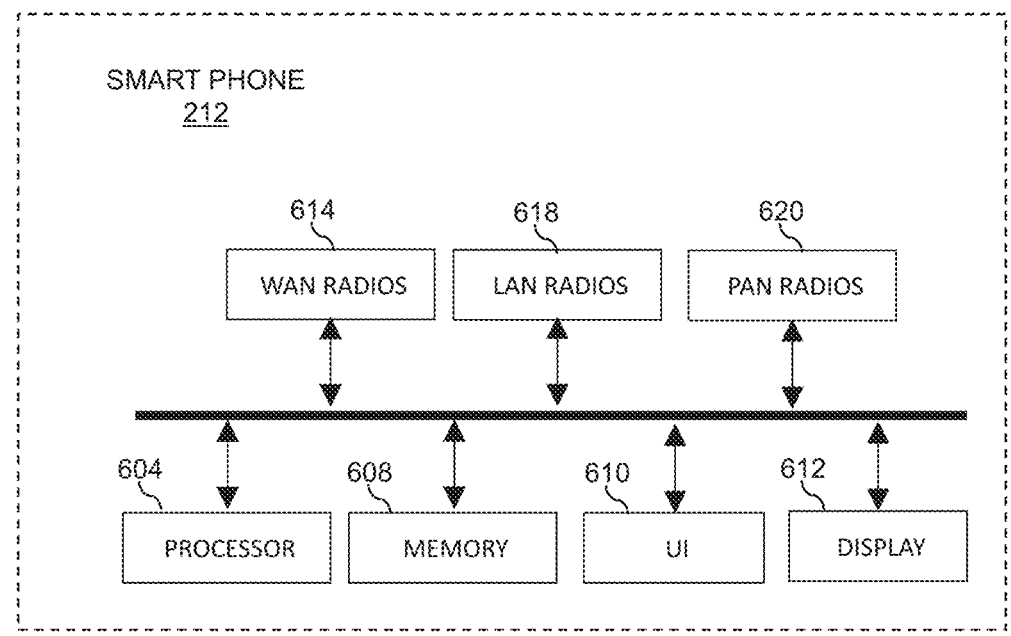
FIG. 6 depicts a block diagram illustrating a smart phone example in accordance with embodiments of the present disclosure.

FIG. 6 depicts a block diagram 600 illustrating the smart phone 212 of FIG. 2 in accordance with embodiments of the present disclosure. The smart phone 212 may include at least a processor 604, a memory 608, a UI 610, a display 612, WAN radios 614, LAN radios 618, and personal area network (PAN) radios 620. In some embodiments the smartphone 900 may be an iPhone® or an iPad®, using iOS® as an operating system. In other embodiments, the smart phone 212 may be a mobile terminal including Android® OS, BlackBerry® OS, or Windows Phone® OS.

In some embodiments, the processor 604 may be a mobile processor such as the Qualcomm® Snapdragon™ mobile processor. The memory 608 may include a combination of volatile memory (e.g. random access memory) and non-volatile memory (e.g. flash memory). The memory 608 may be partially integrated with the processor 604. The UI 610 and display 612 may be integrated such as a touchpad display. The WAN radios 614 may include 2G, 3G, 4G, 5G technologies, or a combination thereof. The LAN radios 618 may include Wi-Fi technologies such as 802.11a, 802.11b/ g/n, 802.11ac circuitry, or a combination thereof. The PAN radios 620 may include Bluetooth® technologies.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including object oriented and/or procedural programming languages. Programming languages may include, but are not limited to: Ruby, JavaScript, Java, Python, Ruby, PHP, C, C++, C#, Objective-C, Go, Scala, Swift, Kotlin, OCaml, or the like. The program code may execute entirely on the user's computer, partly on the user's computer, as a stand-alone software package, partly on the user's computer, and partly on a remote computer or entirely on the remote computer or server. In the latter situation scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method implemented on at least one computing device for facilitating a heating, ventilation, and air conditioning (HVAC) air filter replacement for a first user; the method comprising:
    identifying interface requirements for a set of services to be implemented between service oriented architecture (SOA) front-end components and SOA back-end components, wherein:
        a first SOA front-end component is configured to communicate with a home automation system of the first user;
        a second SOA front-end component is configured to communicate with a graphical user interface (GUI) associated with at least one of the first user and a customer service representative;
        a first SOA back-end component is configured to communicate with a weather service database;
        a second SOA back-end component is configured to communicate with an order fulfillment service; and
        the SOA front-end components are operable to be combined with the SOA back-end components to form an operable SOA solution;
    receiving, over a network, thermostat data associated with a shipping address of a first user;
    receiving, over the network, weather data based on the shipping address of the first user from a weather service database;
    and
    triggering an air filter order scheduled to be shipped to the shipping address of the first user via the order fulfillment service, based upon the weather data and the thermostat data.

2. The method of claim 1, wherein the method further comprises receiving previous order data associated with the first user from the order fulfillment service.

3. The method of claim 2, wherein the previous order data comprises a date of a previous air filter shipment.

4. The method of claim 2, wherein the previous order data comprises an air filter type of a last air filter shipment.

5. The method of claim 2, wherein the previous order data comprises an air filter size of a last air filter shipment.

6. The method of claim 1, wherein the method further comprises receiving first profile data from the GUI.

7. The method of claim 6, wherein the first profile data comprises a first user identification and a first HVAC location, wherein the first HVAC location is a first geolocation.

8. The method of claim 7, wherein the first geolocation is a shipping address for the first user.

9. The method of claim 7, wherein the first profile data comprises billing information.

10. The method of claim 9, wherein the billing information comprises credit card information.

11. The method of claim 7, wherein the first profile data further comprises an air filter size.

12. The method of claim 11, wherein the first profile data further comprises an air filter type.

13. The method of claim 12, wherein the air filter type is at least one of:
a fiberglass filter;
a poly filter;
an accordion filter;
a foam filter;
a foldable filter;
a pleated filter;
a high efficiency particulate arrestance (HEPA) filter; and
a washable filter.

14. The method of claim 11, wherein the first profile data further comprises an HVAC system type.

15. The method of claim 11, wherein the first profile data further comprises HVAC tonnage data.

16. The method of claim 7, wherein the first profile data further includes a heated and/or cooled square footage associated with the first HVAC location.

17. The method of claim 7, wherein the first profile data further comprises network communication information for the home automation system of the first user.

18. The method of claim 17, wherein the first SOA front-end component is further configured to receive motion sensor data from the home automation system of the first user.

19. The method of claim 1 further comprising receiving, over the network, crowdsourced data and triggering the air filter order is further based on crowdsourced data.

20. The method of claim 19, wherein the crowdsourced data includes HVAC maintenance data associated with an HVAC location within a same postal zip code as the shipping address of the first user.

21. A server for facilitating a heating, ventilation, and air conditioning (HVAC) air filter replacement for a first user, the server comprising:
a memory; and
at least one processor configured for:
identifying interface requirements for a set of services to be implemented between service oriented architecture (SOA) front-end components and SOA back-end components, wherein:
a first SOA front-end component is configured to communicate with a home automation system of the first user;
a second SOA front-end component is configured to communicate with a graphical user interface (GUI) associated with at least one of the first user and a customer service representative;
a first SOA back-end component is configured to communicate with a weather service database;
a second SOA back-end component is configured to communicate with an order fulfillment service; and
the SOA front-end components are operable to be combined with the SOA back-end components to form an operable SOA solution;
receiving, over a network, thermostat data associated with a shipping address of a first user;
receiving, over the network, weather data based on the shipping address of the first user from a weather service database;
and
triggering an air filter order scheduled to be shipped to the shipping address of the first user via the order fulfillment service, based upon the weather data and the thermostat data.

22. A non-transitory computer-readable storage medium for facilitating a heating, ventilation, and air conditioning (HVAC) air filter replacement for a first user, the non-transitory computer-readable storage medium storing instructions to be implemented on at least one computing device including at least one processor, the instructions when executed by the at least one processor cause the at least one computing device to perform a method of:
identifying interface requirements for a set of services to be implemented between service oriented architecture (SOA) front-end components and SOA back-end components, wherein:
a first SOA front-end component is configured to communicate with a home automation system of the first user;
a second SOA front-end component is configured to communicate with a graphical user interface (GUI) associated with at least one of the first user and a customer service representative;
a first SOA back-end component is configured to communicate with a weather service database;
a second SOA back-end component is configured to communicate with an order fulfillment service; and
the SOA front-end components are operable to be combined with the SOA back-end components to form an operable SOA solution;
receiving, over a network, thermostat data associated with a shipping address of a first user;
receiving, over the network, weather data based on the shipping address of the first user from a weather service database;
and
triggering an air filter order scheduled to be shipped to the shipping address of the first user via the order fulfillment service, based upon the weather data and the thermostat data.

* * * * *